Sept. 27, 1960    M. S. RIGGLE    2,954,437
TELEGRAPHY EDUCATIONAL DEVICE
Filed Oct. 24, 1957    2 Sheets-Sheet 1
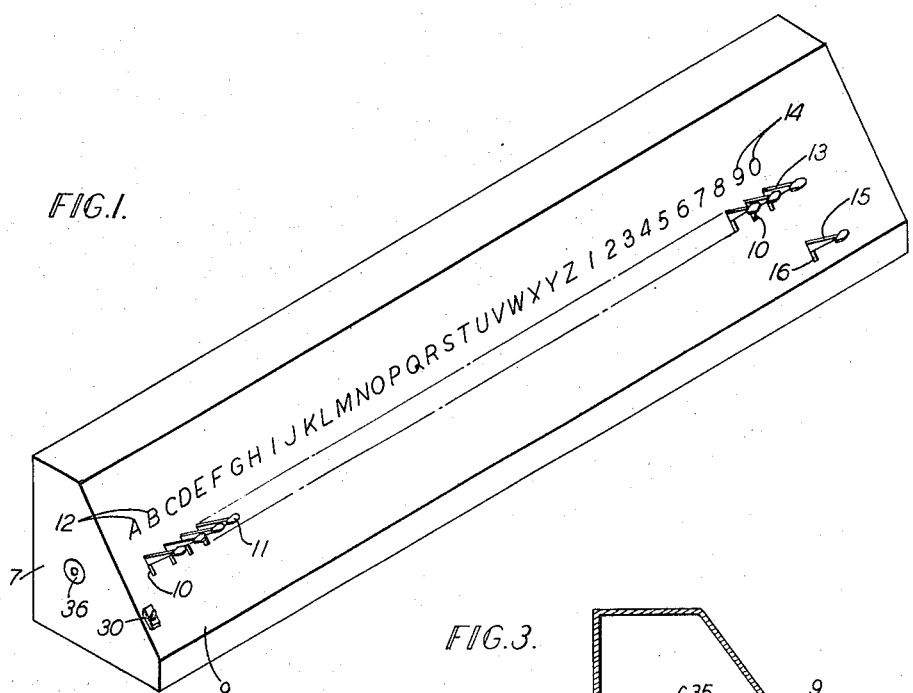
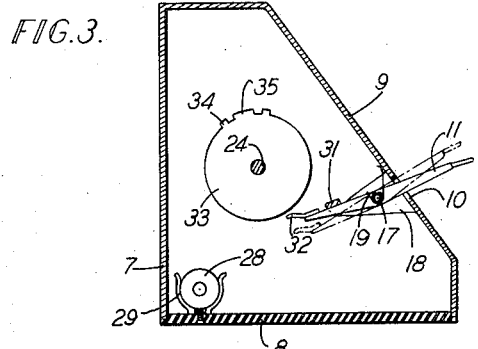
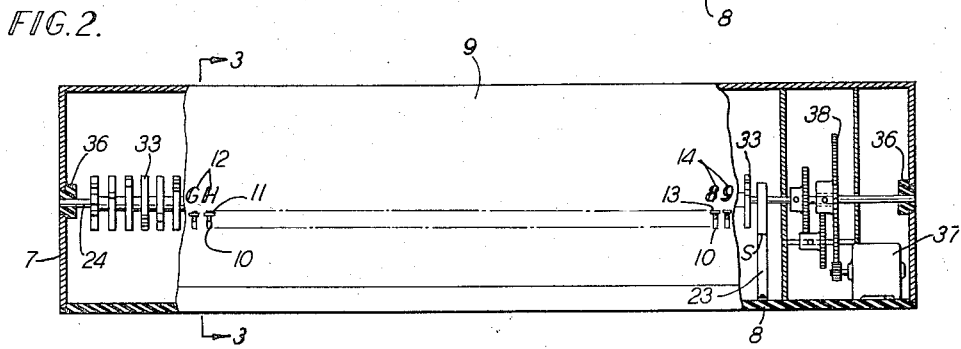
INVENTOR.
MARLAN S. RIGGLE
BY
ATTORNEY Sept. 27, 1960 M. S. RIGGLE 2,954,437
TELEGRAPHY EDUCATIONAL DEVICE
Filed Oct. 24, 1957 2 Sheets-Sheet 2
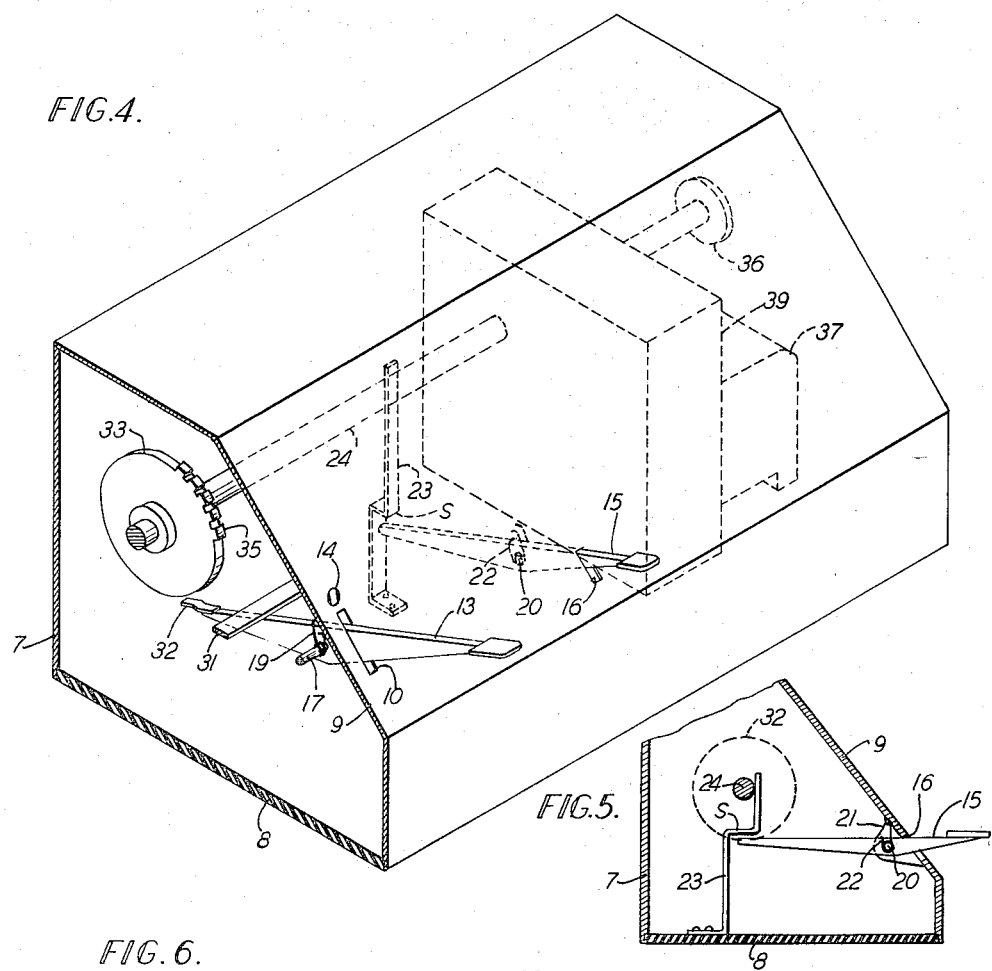
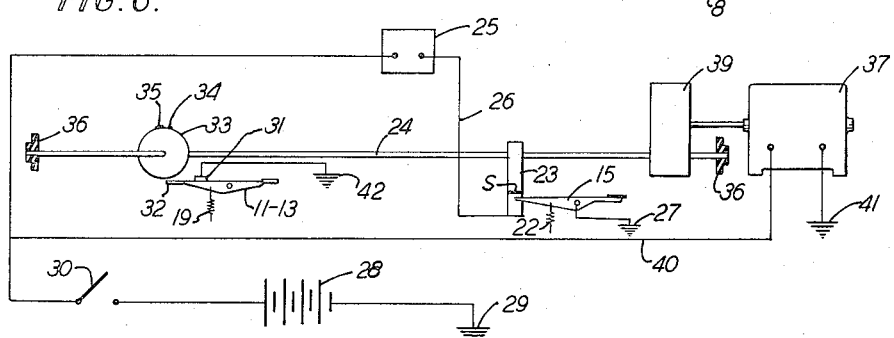
INVENTOR.
MARLAN S. RIGGLE
BY
ATTORNEY

United States Patent Office 2,954,437
Patented Sept. 27, 1960

2,954,437
TELEGRAPHY EDUCATIONAL DEVICE

Marlan S. Riggle, Freeport, Ill., assignor to Structo Manufacturing Company, Freeport, Ill., a corporation of Illinois Filed Oct. 24, 1957, Ser. No. 692,210

8 Claims. (Cl. 178—115)

This invention relates to an educational device designed to facilitate learning the Morse code of telegraphy by first sounding the dot and dash sequence for any given letter or numeral, and then, by operating a practice key, learning to reproduce that sound.

In the device of my invention, keys adapted to be depressed, like the keys of a typewriter, are arranged in a row, one for each letter of the alphabet, and one for each of ten numerals, all of the keys being pivoted intermediate their ends and having their manually operable ends projecting through slots in an elongated case, on the front of which over each key is an identifying legend so that the operator can sound the code for any letter or numeral by merely depressing the appropriate key. Inside the case is an elongated stop bar arranged to be engaged by the keys when depressed to predetermine the spacing of a leaf-spring wiper on the inner end of each key relative to the periphery of a circular cam associated with the key, there being thirty-six of these cams mounted on a common shaft for rotation together, one cam for each letter of the alphabet and one for each of ten numerals, each cam having a different sequence of dot and dash projections on the periphery thereof to slide over the wiper on the associated key and thereby cause the operation of an electrical buzzer, a short buzz for a dot and a longer buzz for a dash. The same electrical buzzer is arranged to be sounded by operation of a practice key, adapted to be manipulated, like a telegrapher's key, so that the operator, after hearing how the Morse code for a given letter or numeral sounds, can learn to reproduce that sound by manipulating the practice key.

The invention is illustrated in the accompanying drawings, in which—

Fig. 1 is a perspective view of a telegraphy educational device made in accordance with my invention;

Fig. 2 is a front view of said device showing the opposite end portions in vertical section for purposes of better illustration;

Fig. 3 is a cross-section on the line 3—3 of Fig. 2 on a slightly larger scale;

Fig. 4 is a perspective view on a still larger scale of one end portion of the device broken away;

Fig. 5 is a cross-section like Fig. 3 but showing the practice key, and

Fig. 6 is an electrical wiring diagram.

The same reference numerals are applied to corresponding parts throughout the views.

Referring to the drawings showing my improved telegraphy device, the reference numeral 7 designates an elongated case that is preferably, though not necessarily, of generally triangular form in cross-section, having a bottom 8 of electrical insulation material, all of the other walls being preferably of sheet metal to serve as a ground. The inclined front wall 9 of the case has thirty-six vertical slots 10 provided therein for twenty-six keys 11, one for each letter of the alphabet, as indicated by the legends 12 over these keys, and ten other keys 13 for the ten numerals, as indicated by the legends 14 above those keys. 15 is the practice key, operating in a slot 16 provided at a lower elevation in the front wall 9 of the case. The keys 11 and 13 are all operable like the keys of a typewriter and are all pivotally mounted intermediate their ends on a horizontal rod 17 suitably supported at its opposite ends on the inner side of the front wall 9 on brackets 18, each key having a grasshopper type spring 19 associated therewith mounted on the rod 17 and bearing at one end on the key and at the other end against the back of the front wall 9 of the case, tending to swing the key in a counterclockwise direction, as shown in dotted lines in Fig. 3, so as to engage the upper ends of the slots 10. The practice key 15 has its own individual mounting, as indicated at 20 in Fig. 4 on brackets 21 carried on the inside of the front wall 9 and has a grasshopper spring 22 coiled around its pivot shaft and bearing at one end on the key and at the other end against the case tending normally to hold it engaged with the upper end of slot 16. The key 15 is limited in its depression by engagement with the lower end of slot 16 as it touches a shoulder S on the leaf spring 23 that is mounted in the case 7 on the insulation bottom 8. This leaf spring serves as an electrical contactor brush by engagement with shaft 24 electrically to connect it and all of the cams 33 with the buzzer 25, as seen at 26 in Fig. 6, while also serving as an electrical contact for engagement at S by the key 15, as seen in Fig. 5. In that way, the operator is enabled by manipulation of the practice key 15 to sound out the dots and dashes by means of the same electrical buzzer 25 that is operated when one of the other keys 11 or 13 is depressed. The key 15 is grounded to the case 7, as indicated at 27 in Fig. 6, and there are dry cell batteries 28 which have one side grounded to the case, as indicated at 29 in Fig. 6, the other side being electrically connected with the buzzer 25 when the switch 30, provided on one end of the case 7, as shown in Fig. 1, is closed. The other keys 11 for the letters of the alphabet and keys 13 for the numerals may all be limited in their depression by engagement with the lower ends of slots 10, if desired, but I have shown a horizontal stop bar 31 inside the case 7 extending over the inner end portions of the keys 11 and 13 and suitably mounted at its opposite ends on brackets 18, serving as a limit stop for all of the keys 11 and 13 to predetermine accurately the spacing of the leaf spring wipers 32 provided on the inner ends of the keys 11 and 13 with respect to the periphery of the disks 33. The latter are mounted on the shaft 24 and have short projections 34 for the sounding of dots and long projections 35 for the sounding of dashes provided on the periphery thereof for slidable engagement with the wipers 32. There are thirty-six of these disks 33 on shaft 24 in the same spaced relationship as the keys 11 and 13, one for each letter of the alphabet disposed in alignment with the associated keys 11 and one for each of the ten numerals disposed in alignment with the associated keys 13, each disk 33 being, of course, provided with the correct sequence of dot and dash projections 34—35 corresponding to the dots and dashes of the Morse code for the given letter or numeral. The shaft 24 is mounted at its opposite ends in fiber bearings 36 and is therefore in insulated relation to the case 7, and it is driven by an electric motor 37 at a predetermined reduced speed in relation to the r.p.m. of the motor through reduction gearing 38 provided in the gear box 39, the motor 37 being thrown into operation only when switch 30 is closed, one side of the motor 37 being connected with switch 30 by conductor 40 and the other side being grounded to the case 7, as indicated at 41 in Fig. 6. Obviously, since the case 7 serves as a ground, all of the keys 11 and 13 and the stop bar 31 mounted in the case are grounded, as indicated at 42 in Fig. 6.

In operation, the one learning the Morse code, or for that matter any comparable signal code, can have the code for any letter or numeral sounded, as often as he or she desires, by merely holding down as long as necessary the appropriate key 11 or 13, as the case may be. Then it is possible by manipulation of the practice key 15 in the same way as a telegrapher's key to practice duplication of the sound for that same letter or numeral. In that way it is much easier to learn the code than by other methods that depend more or less upon unaided memory.

It is believed the foregoing description conveys a good understanding of the objects and advantages of my invention. The appended claims have been drawn to cover all legitimate modifications and adaptations.

I claim:

1. A device of the character described comprising, in combination, a plurality of keys adapted to be depressed manually, one identified with each item of a code, such as a letter, number, or word, each key carrying an electrical contact element, an electric buzzer connected with a source of electric current, cam operating means, a rotary cam associated with each key operated by said means independently of the operation of said keys, at a uniform speed, and having spaced projections on the periphery thereof arranged to have slidable engagement with the contact element carried on the key that is depressed to make and break the electrical circuit for the buzzer and thereby sound correctly with said buzzer, for as many times as the operator desires, the dot and dash code for the item identified with the key depressed, each dot projection on a given cam being short lengthwise of the cam in relation to the corresponding length of each dash projection thereon, and a practice key operable independently of the operation of the other keys and adapted to be manipulated manually like a telegrapher's key and operatively connected with the same buzzer to reproduce by short and long depressions of the key the dot and dash sounds produced by the buzzer in response to manual depression of any one of the other keys.

2. A device as set forth in claim 1, wherein the electrical contact element on each of the first mentioned keys comprises a leaf spring wiper adapted to be deflected by slidable engagement with the projections on the periphery of the rotary cam, which are all on the same radius with respect to the center of the cam, the device including stop means arranged to be engaged by each key when depressed whereby to secure the same operating relationship between contact and cam for all of said keys.

3. A device of the character described comprising, in combination, a plurality of keys adapted to be depressed, one identified with each item of a code, such as a letter, number, or word, each key carrying an electrical contact element, an electric buzzer connected with a source of electric current, a rotary cam associated with each key having spaced projections on the periphery thereof arranged to have slidable engagement with the contact element carried on the key that is depressed to make and break the electrical circuit for the buzzer and thereby sound the dot and dash code for the item identified with the key depressed, each dot projection on a given cam being short circumferentially of the cam in relation to the circumferential length of each dash projection thereon, means for driving all of said cams together at the same predetermined peripheral speed, a metallic case from which the keys project for operation and to which said keys are electrically grounded, said drive means including a drive shaft in electrically insulated relation to said case but electrically connected with said cams, a wiper in electrically insulated relationship to said case engaging said shaft and electrically connected to form part of the electrical circuit for the buzzer and said cams and arranged to serve as a contact engageable by the practice key upon depression of the latter to complete the buzzer circuit, and a practice key also electrically grounded to said case and arranged to engage said wiper when depressed to complete the buzzer circuit and adapted to be manipulated like a telegrapher's key to reproduce with said buzzer by short and long depressions of the key the dot and dash sounds produced by depression of the other keys.

4. A device of the character described comprising, in combination, a plurality of keys adapted to be depressed, one identified with each item of a code, such as a letter, a number, or word, each key carrying an electrical contact element, an electric buzzer connected with a source of electric current, a rotary cam associated with each key having spaced projections on the periphery thereof arranged to have slidable engagement with the contact element carried on the key that is depressed to make and break the electrical circuit for the buzzer and thereby sound the dot and dash code for the item identified with the key depressed, each dot projection on a given cam being short circumferentially of the cam in relation to the circumferential length of each dash projection thereon, means for driving all of said cams together at the same predetermined peripheral speed, a metallic case from which the keys project for operation and to which said keys are electrically grounded, said drive means including a drive shaft in electrically insulated relation to said case but electrically connected with said cams, a wiper in electrically insulated relationship to said case engaging said shaft and electrically connected to form part of the electrical circuit for the buzzer and said cams and arranged to serve as a contact engageable by the practice key upon depression of the latter to complete the buzzer circuit, said drive means being operated continuously independently of the depression of said keys, whereby to enable repetition of the code for a given item as many times as desired so long as the key identified with said letter remains depressed, and a practice key also electrically grounded to said case and arranged to engage said wiper when depressed to complete the buzzer circuit and adapted to be manipulated like a telegrapher's key to reproduce with said buzzer by short and long depressions of the key the dot and dash sounds produced by depression of the other keys.

5. A device of the character described comprising, in combination, a plurality of keys adapted to be depressed, one identified with each item of a code, such as a letter, number, or word, each key carrying an electrical contact element, an electric buzzer connected with a source of electric current, cam operating means, a movable cam associated with each key operated by said means having spaced projections on the periphery thereof arranged to have slidable engagement with the contact element carried on the key that is depressed to make and break the electrical circuit for the buzzer and thereby sound the dot and dash code for the item identified with the key depressed, each dot projection on a given cam being short lengthwise of the cam in relation to the corresponding length of each dash projection thereon, stop means arranged to be engaged by each key when depressed, whereby to secure the same spacing of the contacts on all of said keys with respect to the periphery of said cams, and a practice key adapted to be manipulated like a telegrapher's key and operatively connected with the buzzer to reproduce by short and long depressions of the said practice key the dot and dash sounds produced by said buzzer in response to manual depression of the other keys.

6. A device of the character described comprising, in combination, a plurality of keys adapted to be depressed, one identified with each item of a code, such as a letter, number, or word, an electric buzzer connected with a source of electric current, a rotary cam associated with each key having spaced projections on the periphery thereof arranged to have slidable engagement with a contact element carried on the key to make and break the electrical circuit for the buzzer and thereby sound the dot and dash code for the item identified with the key depressed, each dot projection on a given cam being short circumferentially of the cam in relation to the circumferential length of each dash projection thereon, a single rotary shaft on which all of said cams are mounted for driving all of said cams together at the same predetermined peripheral speed, means for driving said shaft, stop means comprising a bar mounted in fixed parallel relationship to said shaft and extending transversely with respect to said keys and arranged to be engaged by each key when depressed, whereby to secure the same spacing of the contacts on all of said keys with respect to the periphery of said cams, and a practice key adapted to be manipulated like a telegrapher's key and operatively connected with the buzzer to reproduce by short and long depressions of the said practice key the dot and dash sounds produced by said buzzer in response to manual depression of the other keys.

7. A device of the character described comprising, in combination, a plurality of keys adapted to be depressed, one identified with each item of a code, such as a letter, number, or word, an electric buzzer connected with a source of electric current, a rotary cam associated with each key having spaced projections on the periphery thereof arranged to have slidable engagement with a contact element carried on the key to make and break the electrical circuit for the buzzer and thereby sound the dot and dash code for the item identified with the key depressed, each dot projection on a given cam being short circumferentially of the cam in relation to the circumferential length of each dash projection thereon, means for driving all of said cams together at the same predetermined peripheral speed, a metallic case from which the keys project for operation and to which said keys are electrically grounded, said drive means including a drive shaft in electrically insulated relation to said case but electrically connected with said cams, a wiper in electrically insulated relationship to said case engaging said shaft and electrically connected to form part of the electrical circuit for the buzzer and said cams and arranged to serve as a contact engageable by the practice key upon depression of the latter to complete the buzzer circuit, stop means arranged to be engaged by each key when depressed, whereby to secure the same spacing of the contacts on all of said keys with respect to the periphery of said cams, and a practice key also electrically grounded to said case and arranged to engage said wiper when depressed to complete the buzzer circuit and adapted to be manipulated like a telegrapher's key to reproduce with said buzzer by short and long depressions of the said practice key the dot and dash sounds produced by said buzzer in response to manual depression of the other keys.

8. A device as set forth in claim 7 wherein the stop means comprises a bar mounted in said case in fixed parallel relationship to said shaft and extending transversely with respect to the first mentioned keys.

References Cited in the file of this patent

UNITED STATES PATENTS

| | | |
|---|---|---|
| 515,709 | Houck et al. | Feb. 27, 1894 |
| 524,635 | Howe | Aug. 14, 1894 |
| 1,035,257 | St. John | Aug. 13, 1912 |
| 1,283,320 | Ruttmann | Oct. 29, 1918 |